(12) United States Patent
Liu et al.

(10) Patent No.: US 9,600,769 B1
(45) Date of Patent: Mar. 21, 2017

(54) IN-MESSAGE SUGGESTION BY PERSONAL KNOWLEDGE GRAPH CONSTRUCTED FROM USER EMAIL DATA

(71) Applicant: GOOGLE INC., Mountain View, CA (US)

(72) Inventors: Yifang Liu, Mountain View, CA (US); Clemens Buehling, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 626 days.

(21) Appl. No.: 14/099,114

(22) Filed: Dec. 6, 2013

(51) Int. Cl.
*G06N 5/02* (2006.01)

(52) U.S. Cl.
CPC ...................................... *G06N 5/02* (2013.01)

(58) Field of Classification Search
CPC ......................................................... G06N 5/02
See application file for complete search history.

(56) References Cited

U.S. PATENT DOCUMENTS

| | | | |
|---|---|---|---|
| 7,593,995 B1 | 9/2009 | He et al. | |
| 7,657,603 B1 | 2/2010 | He et al. | |
| 7,761,524 B2 | 7/2010 | Carmel et al. | |
| 8,380,875 B1 * | 2/2013 | Gilmour | G06N 5/00 370/352 |
| 8,392,409 B1 | 3/2013 | Kashyap et al. | |
| 8,473,507 B2 | 6/2013 | Loofbourrow et al. | |
| 8,542,606 B2 | 9/2013 | Yach et al. | |
| 8,738,634 B1 * | 5/2014 | Roth | G06F 17/30867 707/748 |
| 9,240,969 B1 * | 1/2016 | Jordan | H04L 51/32 |
| 2002/0194178 A1 * | 12/2002 | Gilmour | G06F 17/30867 707/999.009 |
| 2003/0233419 A1 * | 12/2003 | Beringer | G06Q 10/107 709/206 |
| 2005/0228774 A1 | 10/2005 | Ronnewinkel | |
| 2009/0171904 A1 * | 7/2009 | O'Sullivan | H04L 51/28 707/999.003 |
| 2009/0234876 A1 * | 9/2009 | Schigel | G06F 17/30873 709/203 |
| 2011/0078265 A1 | 3/2011 | Yach et al. | |

(Continued)

*Primary Examiner* — Stanley K Hill
*Assistant Examiner* — Benjamin Buss
(74) *Attorney, Agent, or Firm* — Birch, Stewart, Kolasch & Birch, LLP

(57) ABSTRACT

Provided are methods and systems for constructing a personal knowledge graph for a user based on data contained in existing e-mail messages of the user, and using the personal knowledge graph to provide the user with contextually-relevant content and/or contact suggestions while the user is composing an e-mail message. A personal knowledge graph is constructed based on relations/connections between users and content identified from data contained in e-mail messages sent and/or received by the user. Such relations include content-content relations, user-content relations, and user-(content)-user relations. When a user is composing an e-mail message, the system responsively processes, analyzes, and indexes composing e-mail message data. The composing e-mail message data is used to fetch relevant information from the user's personal knowledge graph and generate one or more content and/or contact suggestions for presentation to the user alongside an e-mail message composing view.

20 Claims, 5 Drawing Sheets

(56) References Cited

U.S. PATENT DOCUMENTS

| | | | |
|---|---|---|---|
| 2011/0087744 A1* | 4/2011 | Deluca | G06Q 10/107 709/206 |
| 2012/0323928 A1 | 12/2012 | Bhatia | |
| 2013/0287187 A1* | 10/2013 | Gandhe | G06F 17/2745 379/93.17 |
| 2014/0321720 A1* | 10/2014 | Bank | G06K 9/00308 382/118 |
| 2015/0134389 A1* | 5/2015 | Punera | G06Q 30/016 705/7.15 |

* cited by examiner

IN-MESSAGE SUGGESTION BY PERSONAL KNOWLEDGE GRAPH CONSTRUCTED FROM USER EMAIL DATA

BACKGROUND

An e-mail service usually acts as a hub of a user's data, messages, communication, and even as a user's information/knowledge base. The information/knowledge base in e-mails could be very large, such that it is usually impractical for the user to know relevant contents among a large amount of e-mails in a situation where such content may be needed, especially if the user subscribes to one or more highly-active mailing lists or large online forums. There is content and/or contact information in the user's e-mail inbox that is not cared by or even read by the user at the time of reception, but which may turn out to be greatly helpful later on at a proper time when the user actually needs the valuable information or critical contact.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for providing online services to users. More specifically, aspects of the present disclosure relate to providing a user with relevant content and/or contact suggestions while the user is composing or viewing an e-mail message.

One embodiment of the present disclosure relates to a computer-implemented method comprising: extracting entity data from existing e-mail messages of a user, wherein the entity data includes content entities and user entities contained in the existing e-mail messages; identifying entity relations between different content entities, between different user entities, and/or between the content entities and the user entities; constructing a personal knowledge graph for the user using the extracted entity data and the identified entity relations; analyzing contents of an e-mail message being composed by the user; identifying, from the personal knowledge graph constructed for the user, entities related to the analyzed contents of the e-mail message, wherein the identified entities include one or more of the content entities, one or more of the user entities, or both; generating one or more entity suggestions based on the identified entities from the personal knowledge graph; and providing the one or more entity suggestions to the user while the e-mail message is being composed by the user.

In another embodiment, the computer-implemented method further comprises identifying, based on the entity relations contained in the personal knowledge graph, one or more content entities, one or more user entities, or both, from the personal knowledge graph that are related to the analyzed contents of the e-mail message.

In another embodiment, the computer-implemented method further comprises analyzing data entered by the user in one or more data fields of the e-mail message, and indexing the analyzed data based on whether the data is determined to be content-related data or contact-related data.

In yet another embodiment, the e-mail message is being composed by the user in an e-mail message composing view, and the computer-implemented method further comprises providing the one or more entity suggestions for presentation to the user in the e-mail message composing view.

In yet another embodiment, the e-mail message is being composed by the user in an e-mail message composing view, and the computer-implemented method further comprises providing the one or more entity suggestions for presentation to the user alongside the e-mail message composing view.

In still another embodiment, the computer-implemented method further comprises receiving, from the user, feedback about the one or more entity suggestions provided to the user, and updating the personal knowledge graph constructed for the user based on the received feedback.

Another embodiment of the present disclosure relates to a system comprising one or more processors and a non-transitory computer-readable medium coupled to the one or more processors having instructions stored thereon that, when executed by the one or more processors, cause the one or more processors to perform operations comprising: extracting entity data from existing e-mail messages of a user, wherein the entity data includes content entities and user entities contained in the existing e-mail messages; identifying entity relations between different content entities, between different user entities, and/or between the content entities and the user entities; constructing a personal knowledge graph for the user using the extracted entity data and the identified entity relations; analyzing contents of an e-mail message being composed by the user; identifying, from the personal knowledge graph constructed for the user, entities related to the analyzed contents of the e-mail message, wherein the identified entities include one or more of the content entities, one or more of the user entities, or both; generating one or more entity suggestions based on the identified entities from the personal knowledge graph; and providing the one or more entity suggestions to the user while the e-mail message is being composed by the user.

Yet another embodiment of the present disclosure relates to one or more non-transitory computer readable media storing computer-executable instructions that, when executed by one or more processors, causes the one or more processors to perform operations comprising: extracting entity data from existing e-mail messages of a user, wherein the entity data includes content entities and user entities contained in the existing e-mail messages; identifying entity relations between different content entities, between different user entities, and/or between the content entities and the user entities; constructing a personal knowledge graph for the user using the extracted entity data and the identified entity relations; analyzing contents of an e-mail message being composed or viewed by the user; identifying, from the personal knowledge graph constructed for the user, entities related to the analyzed contents of the e-mail message, wherein the identified entities include one or more of the content entities, one or more of the user entities, or both; generating one or more entity suggestions based on the identified entities from the personal knowledge graph; and providing the one or more entity suggestions to the user while the e-mail message is being composed or viewed by the user.

In one or more other embodiments, the methods and systems described herein may optionally include one or more of the following additional features: the one or more entity suggestions include one or more content and/or contact suggestions based on the identified entities from the personal knowledge graph; the one or more content and/or contact suggestions include a reference to one of the existing e-mail messages of the user; the identified entity relations include content-content relations, user-content relations, and user-user relations; the entity data is extracted from the existing e-mail messages of the user using one of Singular Value Decomposition and Latent Dirichlet Allocation; and/or the e-mail message is being composed by the user in an e-mail message composing view.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
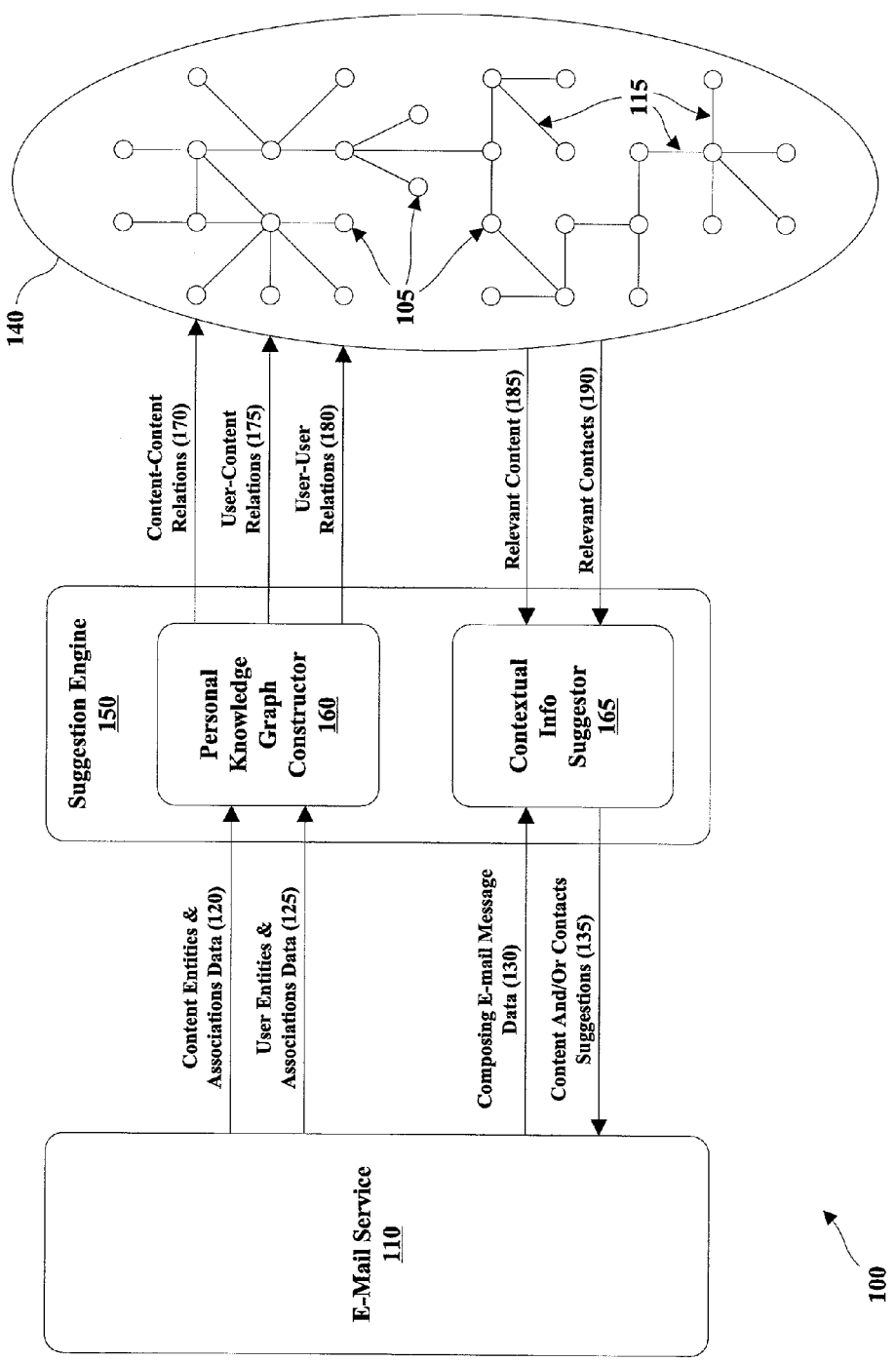
FIG. 1 is a block diagram illustrating an example system for constructing a personal knowledge graph for a user and providing the user with contextually-relevant content and/or contact suggestions while the user is composing an e-mail message according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

Embodiments of the present disclosure relate to methods and systems for constructing a personal knowledge graph for a user based on data contained in existing e-mail messages of the user, and providing the user with contextually-relevant content and/or contact suggestions while the user is composing an e-mail message. As will be described in greater detail below, a personal knowledge graph may be constructed for a user based on various relations/connections between users and content generated or identified by the system from data contained in e-mail messages sent and/or received by the user. In accordance with at least one embodiment, the relations between users and content may include, for example, content-content relations, user-content relations, and user-user (or user-(content)-user) relations. Additional details about the construction of a personal knowledge graph for a user, as well as the generation and provision of contextually-relevant content and/or contact suggestions to the user while the user is composing an e-mail message, will be provided in the sections that follow.

As mentioned above, there is often content and/or contact information contained in e-mails received by a user that is not cared by or, in some instances, even read by the user at the time of reception, but which may be greatly helpful to the user at a later time when the user actually needs the valuable information or critical contact. However, at such later time the user may not be aware of or may not recall the existence of the information contained in the user's previously-received messages, or the user may not know how to efficiently retrieve such information, especially if the user receives a large number of e-mails on a frequent basis. As will be described in greater detail herein, the methods and systems of the present disclosure are capable of extracting useful information from large volumes of e-mail messages and providing such information to the user at the right occasion. Whereas mining through and analyzing a large number of e-mail messages manually is ineffective (e.g., a significant amount of information is likely to be missed or overlooked due to human error), impractical, inefficient, and even intractable, the methods and systems described herein provide a contextual on-the-fly suggestion/assistant for the user, in an intelligent manner at the proper time.

One existing approach for enabling a user to exploit useful information contained in previously-received e-mail messages is by providing the user with various "search" functions. For example, the user may manually supply one or more search keywords and then be directed to a page dedicated to the search results. However, such manual keyword-based search functions on e-mail messages are inefficient and ineffective in assisting the user in reading, writing, and organizing messages for at least two reasons. First, the information contained in e-mail messages often includes multiple aspects, some of which are not clearly detectable or identifiable, and therefore need to be processed, mined, and analyzed in order to be revealed. As such, it is very difficult and time-consuming for the user to perform this processing manually. Second, in order for the processed information obtained from previous e-mails to be useful to the user at the right moment, such information needs to be seamlessly integrated with the current task user is performing (e.g., composing a new e-mail message). This contextual emerging of relevant information at a particular moment requires significant processing and analysis, and is thus impractical for the user to do manually.

Another existing approach involves automatically labeling (e.g., with an identifier, such as a topical category) e-mail messages received by a user based on content contained in the messages and various user profile data and/or user activity data associated with the user's e-mail account. While such an existing approach attempts to analyze the content contained in an e-mail message, there is no analysis performed with respect to any content-content relations, user-content relations, or user-content-user relations, all of which provide the user with helpful information about content perspective, social-relation perspective, and rich content-wise user-connection perspective (e.g., the connection between users formed by their interactions on some categories of content). For example, if user "A" and user "B" thoroughly discussed topic "T" in several e-mail messages, a connection (e.g., a "content-wise user-connection") may be formed between user A and user B over topic T. This existing approach is focused primarily on profile/activity data associated with the e-mail account holder, and therefore, overlooks a large area of knowledge discovery about various things surrounding the user, which the user may not be aware of (e.g., content-content relations, user-content relations, user-user (or user-content-user) relations, etc.). Further, such an approach does not provide the user with any contextual suggestions containing relevant content and/or contact information.

As will be described in greater detail below, the system of the present disclosure is designed to not only focus on information about the particular e-mail account holder, but also analyze and provide information from different perspectives, including, for example, various social and/or professional connections between users in specific contexts or fields. In this manner, the system is capable of providing a user with useful knowledge about one or more other users that have information, abilities, and/or resources that may be very valuable to the user.

FIG. 1 illustrates an example system for constructing a personal knowledge graph for a user based on existing e-mail messages of the user, and providing the user with contextually-relevant content and/or contact suggestions while the user is composing an e-mail message, where the content and/or contact suggestions may be based on data contained in the personal knowledge graph constructed for the user. In accordance with at least one embodiment described herein, the system 100 may include a suggestion engine 150 that interacts with and/or operates within an e-mail service 110, and a personal knowledge graph (KG) 140, which may be constructed and maintained by the suggestion engine 150.

In accordance with one or more embodiments, the suggestion engine 150 may include a personal knowledge graph constructor 160 and a contextual information suggestor 165. The personal knowledge graph constructor 160 may be configured to perform processing and analysis on data contained in a user's existing e-mail messages and, as a result of such processing and analysis, may construct and maintain a personal knowledge graph 140 for the user. As will be described in greater detail below, the personal knowledge graph 140 constructed and maintained for a user may consist of data about various entities 105 and the relations/connections 115 between them. For example, entities 105 may be users (e.g., people, organizations, user groups, etc.), topics/concepts (e.g., ideas, tasks, goals, etc.), numerical values (e.g., dates, monetary values, etc.), and/or various other data that may be contained in e-mail content.

Each of the entities 105 in personal knowledge graph 140 may be associated with one or more other entities 105 through a connection/relation 115. For example, a connection/relation 115 may exist between two entities that are users, between two entities that are topics/concepts, between one entity that is a user and one entity that is a topic/concept, and the like.

In the following description of various embodiments and examples, the different entities 105 that may comprise personal knowledge graph 140 are sometimes referred to as "user entities" and "content entities" for purposes of simplicity, where "content entities" may include topics/concepts, numerical values, and the like. However, it should be understood that categorizing the entities 105 in such a manner is not in any way intended to limit the scope of the present disclosure.

In accordance with at least one embodiment described herein, the personal knowledge graph constructor 160 may be configured to perform offline construction of the personal knowledge graph 140. For example, the personal knowledge graph constructor 160 may extract structured data from a user's existing e-mail messages (e.g., e-mail messages previously sent and/or received by the user in the e-mail service 110) and analyze the relation between different extracted entities. The structured data extracted from the user's existing e-mail messages by the personal knowledge graph constructor 160 may include, for example, content entities and associations data 120 and user entities and associations data 125.

The content entities and associations data 120 that may be extracted from a user's existing e-mail messages by personal knowledge graph constructor 160 may include, for example, topics, concepts, tasks, projects, etc. that are the focus or primary point of discussion in one or more of the e-mail messages, along with data associated with these content entities such as dates and times of the corresponding e-mail messages in which the content entities are mentioned, whether any of the content entities were mentioned in the same e-mail message or chain of e-mail messages, and whether each of the content entities was mentioned in an e-mail message received by the user, sent by the user, or both.

The user entities and associations data 125 that may be extracted from a user's existing e-mail messages by personal knowledge graph constructor 160 may include, for example, users (e.g., people, organizations, user groups, etc.) who have been a sender/receiver of, or who have been mentioned in one or more of the e-mail messages, along with data associated with these user entities such as dates and times of the corresponding e-mail messages of which the user entities were a sender, a receiver, or were mentioned in the content contained therein, whether any of the user entities were recipients of the same e-mail message or were senders/recipients on the same chain of e-mail messages, and whether each of the user entities was the recipient of an e-mail message sent by the user, was the sender of an e-mail message received by the user, or both.

Various existing techniques may be implemented by the personal knowledge graph constructor 160 to perform the entity and relation extraction from a user's existing e-mail messages. Examples of such techniques include SVD (Singular Value Decomposition), LDA (Latent Dirichlet Allocation), various clustering methods, various dimensionality reduction methods, similarity matrix methods, and the like. Using any of these existing methods, the similarities/relations between contents (e.g., keywords, categories, etc.), between users, and between contents and users, may be extracted as groups of data (e.g., data clusters or essential components).

The result of the offline processing performed by the personal knowledge graph constructor 160 may include a set of entities and the relations/connections between them (e.g., entities 105 and relations/connections 115 in personal knowledge graph 140 of the example system 100 shown in FIG. 1). In accordance with one or more embodiments described herein, personal knowledge graph constructor 160 may process/analyze the content entities and associations data 120 and user entities and associations data 125 extracted from the user's existing e-mail messages to generate content-content relations 170, user-content relations 175, and user-user (or user-(content)-user) relations 180, which may be used to construct the personal knowledge graph 140 for the user.

Contextual information suggestor 165 may be configured to perform dynamic (e.g., "on-the-fly") and responsive processing and analysis on an e-mail message being composed, organized, or viewed by a user, such that the contextual information suggestor 165 may pull relevant information (e.g., contacts and/or contents) from the user's personal knowledge graph 140 and formulate the information into contact and/or content suggestions 135 that may be presented to the user. For example, while a user is composing, organizing, or viewing an e-mail message, the contextual information suggestor 165 may process and analyze the e-mail message while also searching, analyzing, and drawing inferences from data contained in the personal knowledge graph 140 constructed for the user (e.g., by personal knowledge graph constructor 160).

For example, when a user is composing an e-mail message (e.g., using e-mail service 110), contextual information suggestor 165 may responsively process, analyze, and index composing e-mail message data 130. Composing e-mail message data 130 may include data input by the user in various components (e.g., data fields) of the message such as subject, recipients, content contained in the body of the e-mail message, etc. The contextual information suggestor 165 may analyze the e-mail message data 130 and index the data according to whether the data is content-related or contact-related. For example, if the analyzed e-mail message data 130 is data entered by the user in the "recipients" data filed of the e-mail message, contextual information suggestor 165 may index the data as contact-related. In another example, if the analyzed e-mail message data 130 is data entered by the user in the "subject" line of the e-mail message, contextual information suggestor 165 may index the data as content-related.

In accordance with at least one embodiment, as contextual information suggestor 165 analyzes and indexes composing e-mail message data 140, contextual information suggestor 165 may also retrieve relevant contacts 190 and content 185 (e.g., other e-mail messages) based on data contained in the user's personal knowledge graph 140. The relevant contacts 190 that may be fetched from the user's personal knowledge graph 140 by contextual information suggestor 165 may include, for example, one or more users that have been involved in earlier discussions (e.g., previously sent and/or received e-mails) on a topic that the user is currently composing an e-mail message about, one or more users that have recently been to a location mentioned in the e-mail message currently being composed by the user, and the like.

The relevant content 185 that may be fetched from the user's personal knowledge graph 140 by contextual information suggestor 165 may include, for example, one or more e-mail messages on the same topic that the user is currently composing an e-mail message about, or one or more e-mail messages on a topic related to the topic that the user is currently composing an e-mail message about. For example, the relevant content 185 may be an e-mail message previously sent or received by the user on a closely related topic that may be in a same or similar procedure of the topic that the user is currently composing an e-mail message about. In another example, the relevant content 185 may be one or more e-mail messages containing content that demonstrates a better way/concept to present a solution, a proposal, an accomplishment, a resume, any of which the user is trying to describe in the composing e-mail message.

In yet another example, the relevant content 185 that may be retrieved from the user's personal knowledge graph 140 by contextual information suggestor 165 may include a suggestion to meet up at a particular location that one or more users who are in the recipient list of the composing e-mail message are determined to be in close proximity of during overlapping time periods. In still another example, the relevant content 185 may be a suggestion to collaborate on something (e.g., a project or plan) that is being described by the user in the composing e-mail message.

Based on the relevant contacts 190 and content 185 retrieved by contextual information suggestor 165 from the user's personal knowledge graph 140, contextual information suggestor 165 may generate one or more content and/or contact suggestions 135 and provide such suggestions for presentation to the user while the user is composing an e-mail message. For example, one or more content and/or contact suggestions 135 may be presented to the user in or alongside an e-mail message composing view, as will be further described below with reference to FIG. 4.

Figure 4:
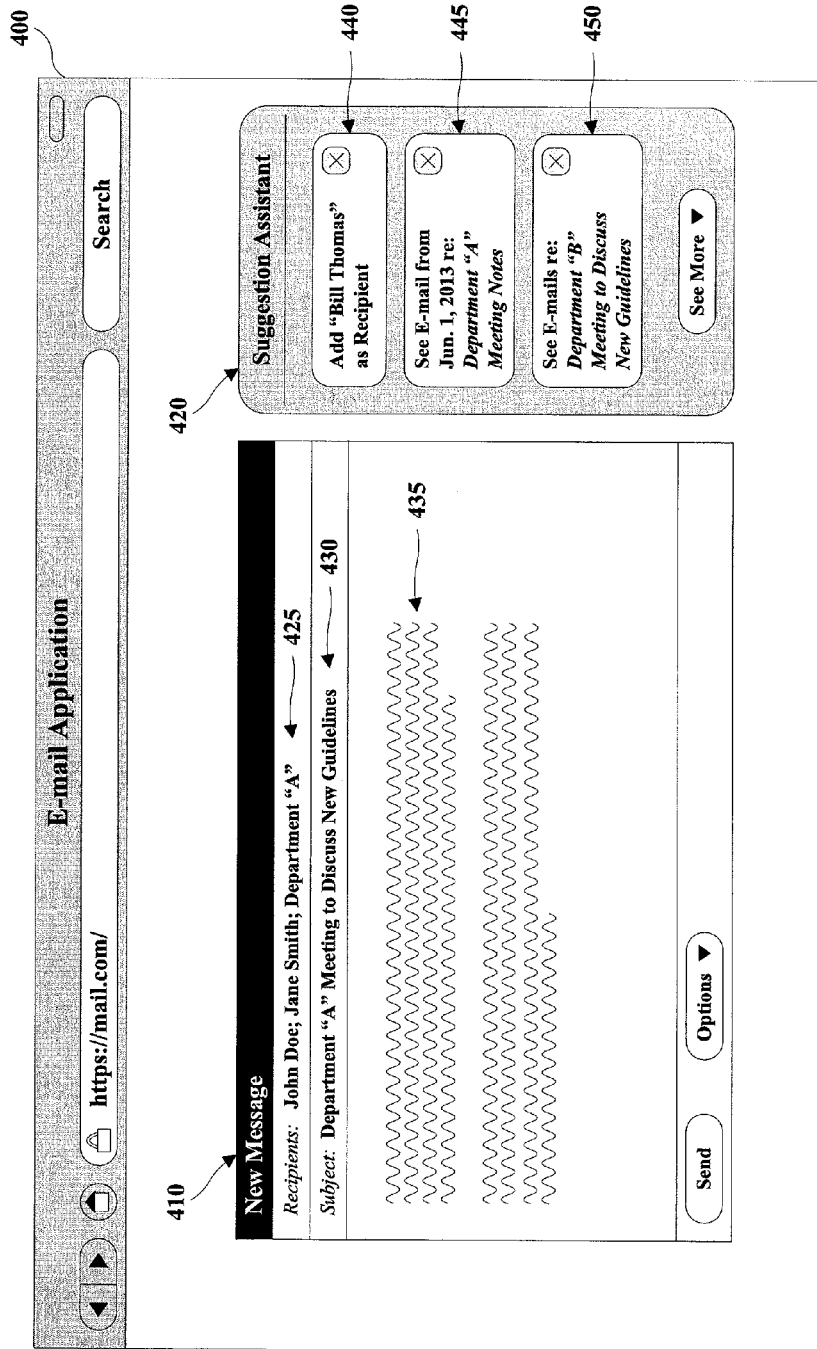
FIG. 4 is a user interface screen showing an example of contextually-relevant content and/or contact suggestions presented to a user in an e-mail message composing view according to one or more embodiments described herein.

FIG. 4 is a user interface showing an example of contextually-relevant content and/or contact suggestions (e.g., content and/or contact suggestions 145 provided by suggestion engine 150 in the example system 100 shown in FIG. 1) presented to a user in an e-mail message composing view in accordance with one or more embodiments described herein. The example user interface 400 includes a suggestion assistant 420 provided alongside an e-mail message composing view 410. The e-mail message composing view 410 may include, for example, one or more intended recipients 425 of the e-mail message, a subject of the e-mail message 430, and also content 435 contained in the body of the e-mail message. The suggestion assistant 420 may include various content and/or contact suggestions 440, 445, and 450, which may be relevant to one or more aspects of the e-mail message being composed 410.

It should be understood that the arrangement of components illustrated in user interface 400 is exemplary in nature, and content and/or contact suggestions (e.g., content and/or contact suggestions 440, 445, and 450) may be presented to a user in numerous other ways in addition to or instead of the example manner shown in user interface 400. For example, in accordance with one or more embodiments described herein, content and/or contact suggestions 440, 445, and 450 may be presented to a user in the e-mail message composing view 410, rather than in suggestion assistant 420 located alongside the e-mail message composing view 410. Additionally, in accordance with one or more other embodiments described herein, content and/or contact suggestions 440, 445, and 450 may be presented to a user in a suggestion assistant arranged in a location different from the location of suggestion assistant 420 in user interface 400.

It should also be understood that the terms "suggestion engine," "personal knowledge graph," "contextual info suggestor," and "personal knowledge graph constructor" are exemplary in nature and are not in any way intended to limit the scope of the present disclosure. Rather, various other terms or phrases may also be used to refer to the different components comprising the system for constructing a personal knowledge graph for a user based on existing e-mail messages of the user, and providing the user with contextually-relevant content and/or contact suggestions while the user is composing an e-mail message, in addition to or instead of the example terms and phrases used in connection with the example system 100 shown in FIG. 1 and described above.

Figure 2:
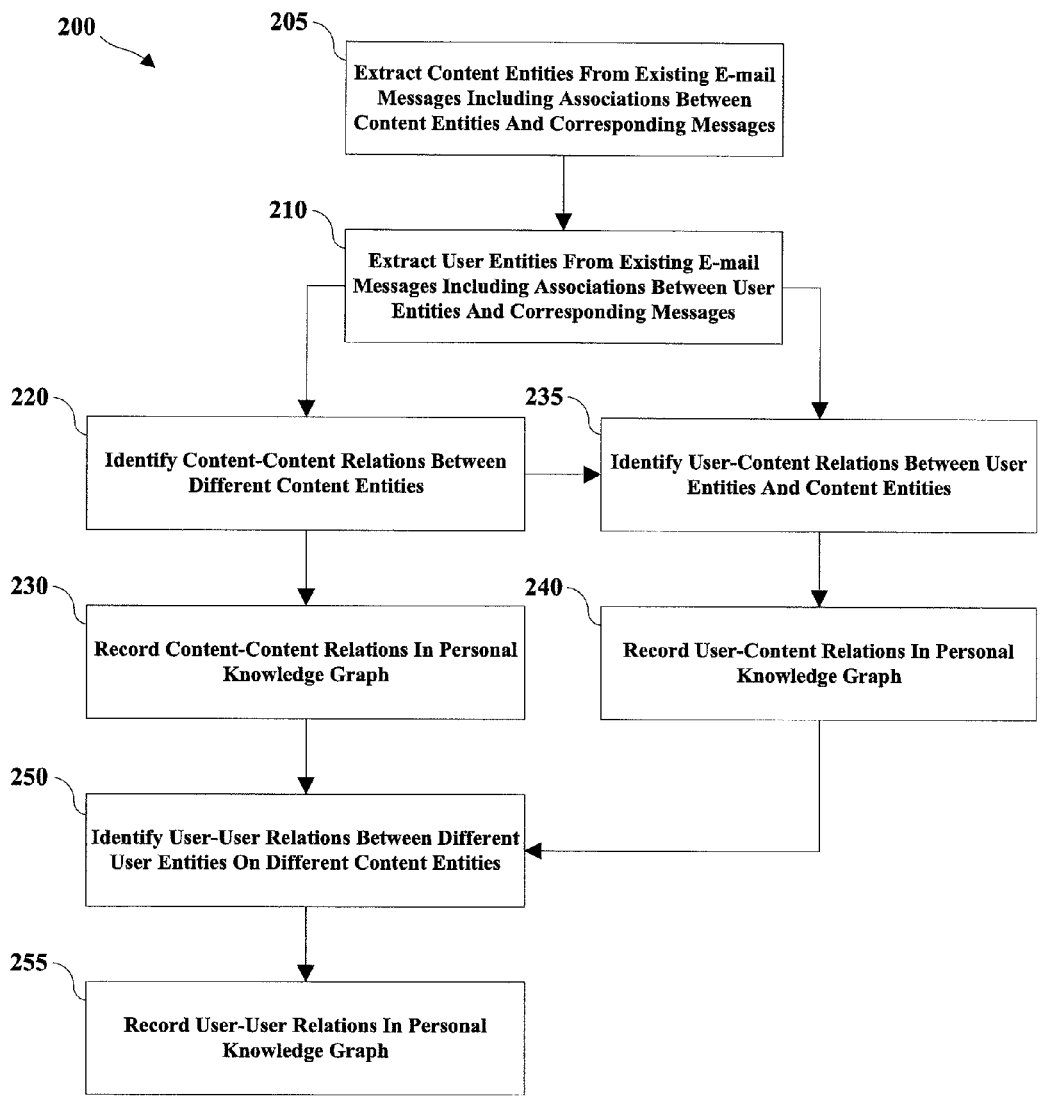
FIG. 2 is a flowchart illustrating an example method for constructing a personal knowledge graph for a user based on data contained in existing e-mail messages of the user according to one or more embodiments described herein.

FIG. 2 illustrates an example process for constructing a personal knowledge graph for a user according to one or more embodiments described herein. In accordance with at least one embodiment, the example process 200 may be performed by a personal knowledge graph constructor (e.g., personal knowledge graph constructor 160 of suggestion engine 150 in the example system 100 shown in FIG. 1) based on data contained in a user's existing e-mail messages (e.g., e-mail messages sent and/or received by the user through, for example, e-mail service 110 in the example system 100 shown in FIG. 1).

At block 205, content entities may be extracted from a user's existing e-mail messages along with associations between the content entities and the corresponding e-mail messages. For example, in accordance with at least one embodiment, data about various content entities and the associations between them may be extracted from one or more e-mail messages previously sent and/or received by the user (e.g., content entities and associations data 120 extracted from e-mail service 110 by suggestion engine 150 in the example system 100 shown in FIG. 1). Examples of content entities that may be extracted at block 205 include "Department A Meeting," "Project B Update," "Corporate Event C," and the like, while the associations data that may be extracted therewith may include, for example, dates and times of corresponding e-mail messages in which the content entities were mentioned, whether any of the content entities were mentioned in the same e-mail message or chain of e-mail messages, and whether each of the content entities was mentioned in an e-mail message received by the user, sent by the user, or both.

At block 210, user entities may be extracted from the user's existing e-mail messages along with associations between the user entities and the corresponding e-mail messages. For example, in accordance with at least one embodiment, data about user entities and the associations between the user entities may be extracted from one or more e-mail messages previously sent and/or received by the user (e.g., user entities and associations data 125 extracted from e-mail service 110 by suggestion engine 150 in the example system 100 shown in FIG. 1). Examples of user entities that may be extracted at block 210 include "John Smith," "Organization EFG," "Department Y," and the like. The associations data between the user entities that may also be extracted at block 210 may include, for example, dates and times of corresponding e-mail messages of which the user entities were a sender, a recipient, or were mentioned in the content contained therein, whether any of the user entities were recipients of the same e-mail message or were senders/recipients on the same chain of e-mail messages, and whether each of the user entities was the recipient of an e-mail message sent by the user, was the sender of an e-mail message received by the user, or both.

At block 220, content-content relations may be identified between the different content entities extracted at block 205, and at block 230 these content-content relations may be recorded in a personal knowledge graph for the user. Such content-content relations may include, for example, a first content entity being contained in or being a part of a second content entity (e.g., topic "x" being one of several topics covered by larger concept "y"), a first content entity being a necessary/sufficient condition for a second content entity (e.g., a first content entity being "Project A" and a second content entity being "Updated Project A"), etc. In accordance with at least one embodiment, a personal knowledge graph constructor (e.g., personal knowledge graph constructor 160 in the example system 100 shown in FIG. 1) may identify one or more relations/connections between different content entities and incorporate these identified content-content relations into the personal knowledge graph constructed for the particular user (e.g., content-content relations 170 recorded in personal knowledge graph 140 in the example system 100 shown in FIG. 1).

At block 235, user-content relations may be identified between the user entities extracted at block 210 and the content entities extracted at block 205. At block 240, these identified user-content relations may be recorded in the personal knowledge graph of the user. The user-content relations identified at block 235 may include, for example, a user entity asking a question about a content entity, a user entity answering a question about a content entity, a user entity being identified as an expert on a particular content entity, a user entity proposing, planning, discussing, or executing something involving a particular content entity, etc. In accordance with at least one embodiment, the user-content relations may be identified at block 235 by a personal knowledge graph constructor (e.g., personal knowledge graph constructor 160 in the example system 100 shown in FIG. 1), which may then record (at block 240) the identified user-content relations in the personal knowledge graph constructed for the user (e.g., user-content relations 175 recorded in personal knowledge graph 140 in the example system 100 shown in FIG. 1).

At block 250, user-user relations may be identified between different user entities on different content entities, and at block 255, these identified user-user relations may be recorded in the personal knowledge graph of the user. The user-user relations identified at block 250 may also be considered user-(content)-user relations, as the relation/connection between two different user entities may be based on a content entity common to both of the user entities. For example, a user-user relation may be identified where a first user entity and a second user entity have a similar interest in or opinion on a particular content entity (e.g., user "A" and user "B" have both discussed topic "z" at length in several e-mail messages), where a first user entity and a second user entity have been collaborating on a particular content entity (e.g., user "A" and user "B" have been exchanging e-mail messages about plans or developments of concept "w"), etc. In accordance with at least one embodiment, the user-user relations may be identified at block 250 by a personal knowledge graph constructor (e.g., personal knowledge graph constructor 160 in the example system 100 shown in FIG. 1), which may record the identified user-user relations in the personal knowledge graph constructed for the user (e.g., user-user relations 180 recorded in personal knowledge graph 140 in the example system 100 shown in FIG. 1).

Figure 3:
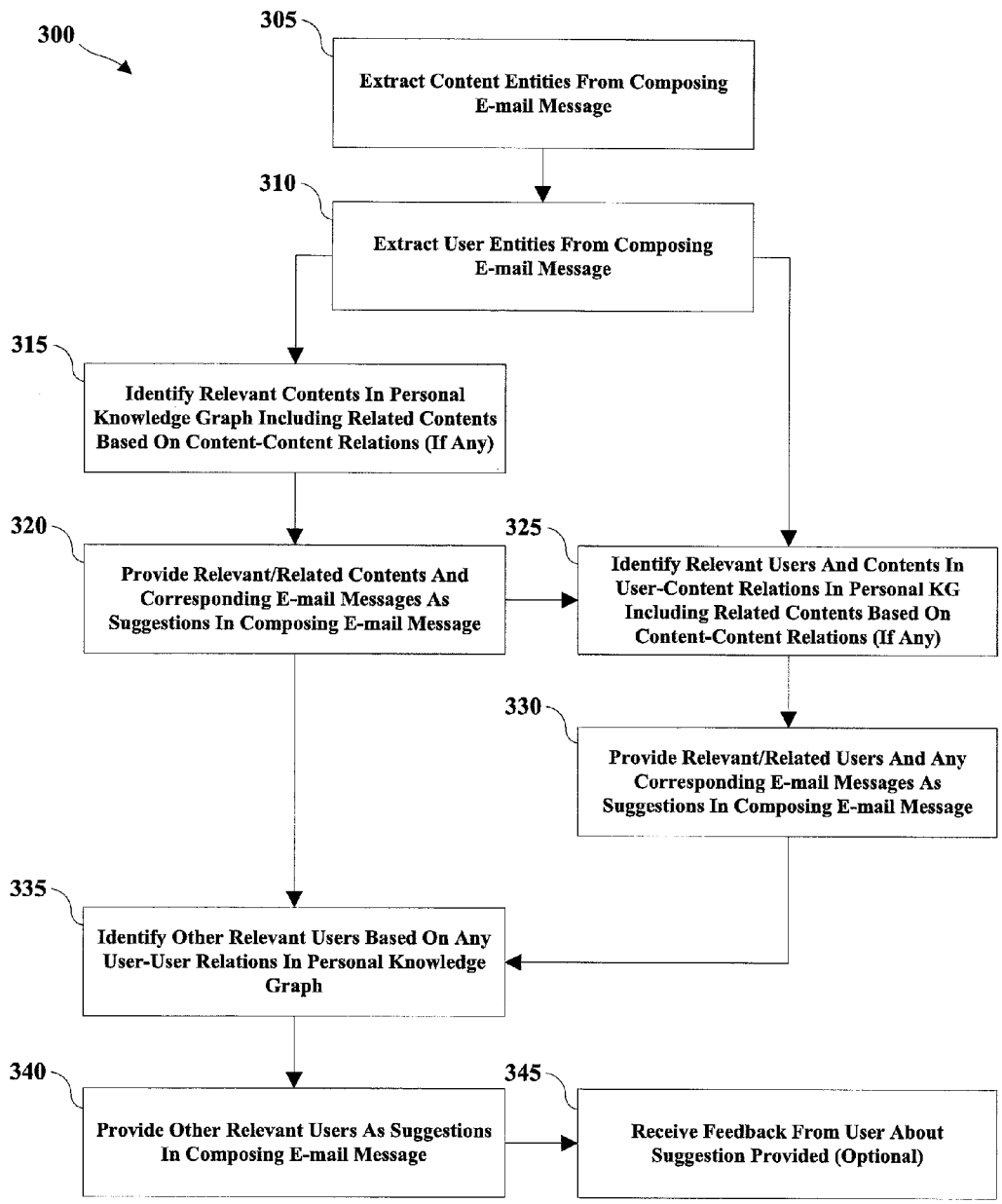
FIG. 3 is a flowchart illustrating an example method for providing a user with contextually-relevant content and/or contact suggestions while the user is composing an e-mail message according to one or more embodiments described herein.

FIG. 3 illustrates an example process for providing a user with contextually-relevant content and/or contact suggestions while the user is composing (or viewing or organizing) an e-mail message according to one or more embodiments described herein. In accordance with at least one embodiment, the example process 300 may be performed by a contextual information suggestor based on data contained in an e-mail message being composed, viewed, or organized by a user, and also based on data pulled from a personal knowledge graph of the user (e.g., contextual information suggestor 165 of suggestion engine 150, which may provide content and/or contact suggestions 135 based on composing e-mail message data 130 and relevant content 185 and contacts 190 from personal knowledge graph 140, in the example system 100 shown in FIG. 1).

At blocks 305 and 310, content entities and user entities, respectively, may be extracted from an e-mail message being composed by a user (e.g., in e-mail service 110 in the example system 100 shown in FIG. 1). The content and user entities extracted at blocks 305 and 310, respectively, may include one or more components of the e-mail message such as, for example, subject, recipients, content contained in the body of the e-mail message, etc. In accordance with at least one embodiment, the content and user entities may be extracted at blocks 305 and 310, respectively, by a contextual information suggestor, which may be configured to responsively process, analyze, and index data contained in an e-mail message while the message is being composed by a user (e.g., contextual information suggestor 165, which may process and analyze composing e-mail message data 130 in the example system 100 shown in FIG. 1).

At block 315, contents relevant to the content entities extracted at block 305 may be identified in the user's personal knowledge graph (e.g., relevant content 185 identified from personal knowledge graph 140 by contextual info suggestor 165 in the example system 100 shown in FIG. 1). In accordance with at least one embodiment, the relevant contents identified at block 315 may include one or more related contents based on any content-content relations contained in the user's personal knowledge graph. For example, suppose that at block 305 the content entity "concept X" is extracted from the e-mail message being composed by the user (e.g., "concept X" is mentioned in the subject of the e-mail message). At block 315, one or more existing e-mail messages of the user (e.g., e-mail messages previously sent and/or received by the user) in which "concept X" is also a main subject/topic may be identified from data contained in the personal knowledge graph of the user (e.g., from entities 105 contained in personal knowledge graph 140 in the example system 100 shown in FIG. 1). In addition, depending on any content-content relations contained in the user's personal knowledge graph (e.g., content-content relations 170, represented as relations/connections 115 between entities 105 in personal knowledge graph 140), one or more other contents related to "concept X" may also be identified at block 315. For example, the user's personal knowledge graph may include a content-content relation between "concept X" and "concept W" (e.g., where "concept W" is a necessary condition for "concept X"). In such a scenario, one or more existing e-mail messages of the user in which "concept W" is a main subject/topic may also be identified at block 315.

At block 320, the relevant contents and any related contents identified at block 315 may be provided to the user as suggestions while the user composes the e-mail message (e.g., content suggestions 445 and 450 provided in suggestion assistant 420 alongside e-mail message composing view 410 in the example user interface 400 shown in FIG. 4). In accordance with at least one embodiment, the relevant and related contents identified at block 320 may be provided as suggestions by a contextual info suggestor (e.g., content suggestions 135 provided by contextual info suggestor 165 in the example system 100 shown in FIG. 1).

At block 325, users and contents relevant to the user entities extracted at block 310 may be identified in the user's personal knowledge graph (e.g., relevant content 185 and contacts 190 identified from personal knowledge graph 140 by contextual info suggestor 165 in the example system 100 shown in FIG. 1). In accordance with at least one embodiment, relevant users and contents may be identified at block 325 based on any user-content relations contained in the user's personal knowledge graph (e.g., user-content relations 175 contained in personal knowledge graph 140). In accordance with at least one other embodiment described herein, the relevant content identified at block 325 may also include one or more related contents based on any additional content-content relations identified in the user's personal knowledge graph from the existing user-content relations. The relevant users that may be identified at block 325 may include, for example, users that have been included on (e.g., as a sender and/or receiver of) one or more existing e-mail messages of the user (e.g., previously sent and/or received e-mails) on the topic that the user is currently composing an e-mail message about, one or more users that have recently been to a location mentioned in the e-mail message being composed by the user, etc.

At block 330, the relevant users and content identified at block 325, as well as any any additional related contents identified at block 325, may be provided to the user as suggestions while the user composes the e-mail message (e.g., contact suggestion 440 and content suggestions 445, 450 provided in suggestion assistant 420 alongside e-mail message composing view 410 in the example user interface 400 shown in FIG. 4). In accordance with at least one embodiment, the relevant users and content identified at block 325 may be provided as suggestions by a contextual info suggestor (e.g., contact and/or content suggestions 135 provided by contextual info suggestor 165 in the example system 100 shown in FIG. 1).

At block 335, other relevant users may be identified based on any user-user (or user-(content)-user) relations contained in the personal knowledge graph of the user (e.g., user-user relations 180 contained in personal knowledge graph 140 in the example system 100 shown in FIG. 1). For example, suppose user "A" is identified as a relevant user at block 325 based on a user-content relation that exists between user "A" and "concept Y" in the personal knowledge graph of a user, where "concept Y" is a content entity extracted from an e-mail message being composed by the user (at block 305). Further suppose that a user-user relation exists between user "A" and user "D" in the personal knowledge graph based on users "A" and "D" both having a similar interested in "concept E", "concept F", and "concept G". In such a scenario, user "D" may be identified as another relevant user at block 335, and user "D" may be provided to the user as an additional suggested contact at block 340.

In accordance with one or more embodiments described herein, the example process 300 may optionally include, at block 345, receiving feedback from the user about one or more of the suggestions provided to the user at blocks 320, 330, and 340. Such feedback received from the user at block 345 may be used, for example, to customize (e.g., filter) future suggestions that may be provided to the user when composing an e-mail message. In accordance with at least one embodiment, the feedback received from the user at block 345 may be used to update the user's personal knowledge graph (e.g., flagging, removing, modifying, etc. one or more of the entities 105 and/or connection/relations 115 contained in personal knowledge graph 140 in the example system 100 shown in FIG. 1).

Figure 5:
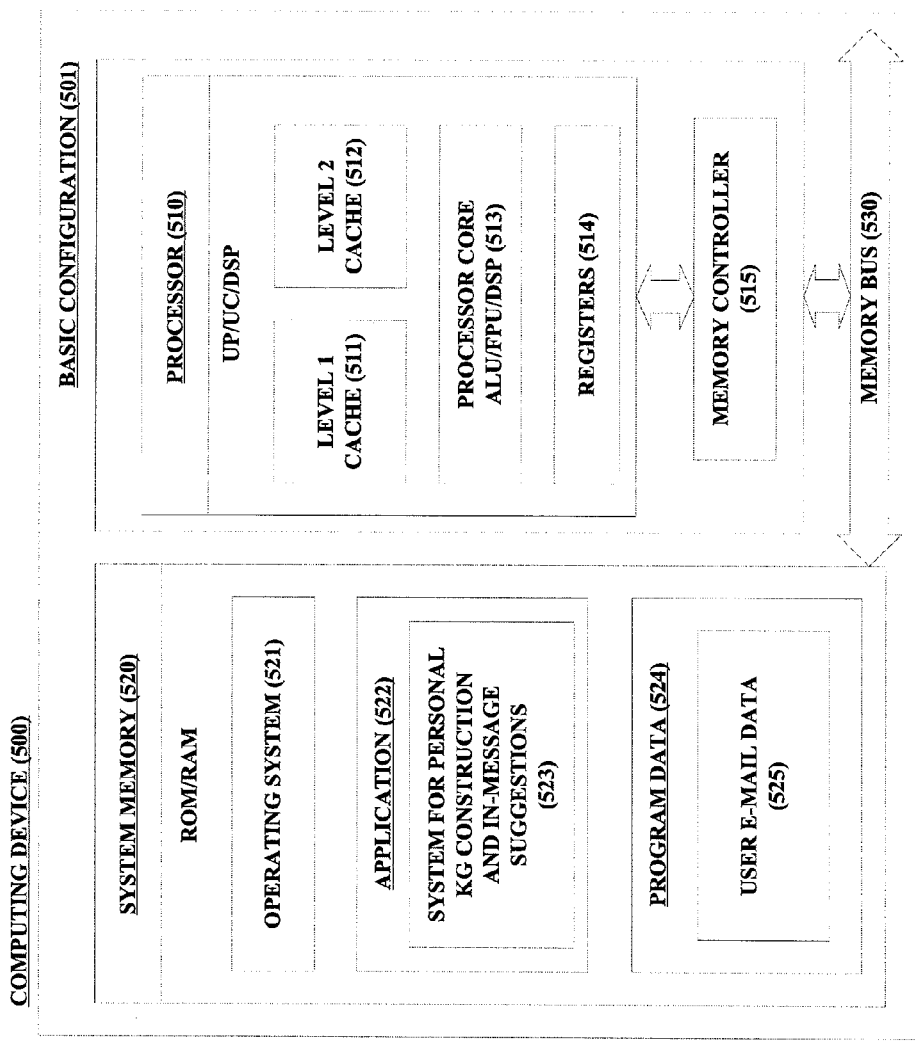
FIG. 5 is a block diagram illustrating an example computing device arranged for constructing a personal knowledge graph for a user and providing the user with contextually-relevant content and/or contact suggestions while the user is composing an e-mail message according to one or more embodiments described herein.

FIG. 5 is a high-level block diagram of an example computer (500) that is arranged for constructing a personal knowledge graph for a user and using the personal knowledge graph to provide the user with contextually-relevant content and/or contact suggestions while the user is composing an e-mail message. In a very basic configuration (501), the computing device (500) typically includes one or more processors (510) and system memory (520). A memory bus (530) can be used for communicating between the processor (510) and the system memory (520).

Depending on the desired configuration, the processor (510) can be of any type including but not limited to a microprocessor (µP), a microcontroller (µC), a digital signal processor (DSP), or any combination thereof. The processor (510) can include one more levels of caching, such as a level one cache (511) and a level two cache (512), a processor core (513), and registers (514). The processor core (513) can include an arithmetic logic unit (ALU), a floating point unit (FPU), a digital signal processing core (DSP Core), or any combination thereof. A memory controller (516) can also be used with the processor (510), or in some implementations the memory controller (515) can be an internal part of the processor (510).

Depending on the desired configuration, the system memory (520) can be of any type including but not limited to volatile memory (such as RAM), non-volatile memory (such as ROM, flash memory, etc.) or any combination thereof. System memory (520) typically includes an operating system (521), one or more applications (522), and program data (524). The application (522) may include a system for personal knowledge graph construction and in-message suggestions 525, which may be configured to process and analyze data contained in existing e-mail messages of a user to generate various relations/connections between users and content contained in the e-mail messages and construct a personal knowledge graph for the user (e.g., personal knowledge graph 140 in the example system 100 shown in FIG. 1). The system for personal knowledge graph construction and in-message suggestions 525 may further be configured to perform dynamic and responsive processing and analysis on an e-mail message being composed, organized, or viewed by a user, fetch relevant information (e.g., contacts and/or contents) from the user's personal knowledge graph, and formulate the relevant information into one or more suggestions that may be presented to the user alongside an e-mail message composing view (e.g., e-mail message composing view 410 in the example user interface 400 shown in FIG. 4).

Program Data (524) may include storing instructions that, when executed by the one or more processing devices, implement a system and method for constructing a personal knowledge graph for a user and using the personal knowledge graph to provide the user with contextually-relevant content and/or contact suggestions while the user is composing an e-mail message. Additionally, in accordance with at least one embodiment, program data (524) may include user e-mail data (525), which may relate to various components of e-mail messages such as subject, recipients, content contained in the bodies of the e-mail messages, etc. In some embodiments, the application (522) can be arranged to operate with program data (524) on an operating system (521).

The computing device (500) can have additional features or functionality, and additional interfaces to facilitate communications between the basic configuration (501) and any required devices and interfaces.

System memory (520) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of the device (500).

The computing device (500) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (500) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location).

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
    extracting content entity data from existing e-mail messages of a user, wherein the content entity data includes content entities and their association with the e-mail message from which it was extracted;
    extracting user entity data from the user's existing e-mail messages, wherein the user entity data includes user entities and their association with the e-mail message from which it was extracted;
    identifying content-content relations between the extracted content entities;
    identifying user-content relations between the extracted user entities and the extracted content entity;
    identifying entity-entity relations between different extracted user entities;
    constructing a personal knowledge graph for the user including the extracted content entities, the extracted user entities, the identified content-content relations, the identified user-content relations, and the identified entity-entity relations;
    analyzing contents of an e-mail message being composed by the user;
    identifying, from the personal knowledge graph constructed for the user, entities related to the analyzed contents of the e-mail message, wherein the identified entities include one or more of the content entities, one or more of the user entities, or both;
    generating one or more entity suggestions based on the identified entities and the content-content relations, user-content relations, and/or entity-entity relations included in the user's personal knowledge graph; and
    providing the one or more entity suggestions to the user while the e-mail message is being composed by the user.

2. The computer-implemented method of claim 1, wherein identifying, from the personal knowledge graph constructed for the user, entities related to the analyzed contents of the e-mail message includes:
    identifying, based on the entity relations contained in the personal knowledge graph, one or more content entities, one or more user entities, or both, from the personal knowledge graph that are related to the analyzed contents of the e-mail message.

3. The computer-implemented method of claim 1, wherein the one or more entity suggestions include one or more content and/or contact suggestions based on the identified entities from the personal knowledge graph.

4. The computer-implemented method of claim 3, wherein the one or more content and/or contact suggestions include a reference to one of the existing e-mail messages of the user.

5. The computer-implemented method of claim 1, wherein the identified entity relations include content-content relations, user-content relations, and user-user relations.

6. The computer-implemented method of claim 1, wherein analyzing the contents of the e-mail message being composed by the user includes:
    analyzing data entered by the user in one or more data fields of the e-mail message; and
    indexing the analyzed data based on whether the data is determined to be content-related data or contact-related data.

7. The computer-implemented method of claim 1, wherein the entity data is extracted from the existing e-mail messages of the user using one of Singular Value Decomposition and Latent Dirichlet Allocation.

8. The computer-implemented method of claim 1, wherein the e-mail message is being composed by the user in an e-mail message composing view, further comprising:
    providing the one or more entity suggestions for presentation to the user in the e-mail message composing view.

9. The computer-implemented method of claim 1, wherein the e-mail message is being composed by the user in an e-mail message composing view, further comprising:
    providing the one or more entity suggestions for presentation to the user alongside the e-mail message composing view.

10. The computer-implemented method of claim 1, further comprising:
    receiving, from the user, feedback about the one or more entity suggestions provided to the user; and
    updating the personal knowledge graph constructed for the user based on the received feedback.

11. A system comprising:
    one or more processors; and
    a non-transitory computer-readable medium coupled to said one or more processors having instructions stored thereon that, when executed by said one or more processors, cause said one or more processors to perform operations comprising:
        extracting content entity data from existing e-mail messages of a user, wherein the content entity data includes content entities and their association with the e-mail message from which it was extracted;
        extracting user entity data from the user's existing e-mail messages, wherein the user entity data includes user entities and their association with the e-mail message from which it was extracted;
        identifying content-content relations between the extracted content entities;
        identifying user-content relations between the extracted user entities and the extracted content entity;
        identifying entity-entity relations between different extracted user entities;
        constructing a personal knowledge graph for the user including extracted content entities, the extracted user entities, the identified content-content relations, the identified user-content relations, and the identified entity-entity relations;
        analyzing contents of an e-mail message being composed by the user;
        identifying, from the personal knowledge graph constructed for the user, entities related to the analyzed contents of the e-mail message, wherein the identified entities include one or more of the content entities, one or more of the user entities, or both;

generating one or more entity suggestions based on the identified entities and the content-content relations, user-content relations, and/or entity-entity relations included in from the personal knowledge graph; and providing the one or more entity suggestions to the user while the e-mail message is being composed by the user.

12. The system of claim 11, wherein the one or more processors are caused to perform further operations comprising:

identifying, based on the entity relations contained in the personal knowledge graph, one or more content entities, one or more user entities, or both, from the personal knowledge graph that are related to the analyzed contents of the e-mail message.

13. The system of claim 11, wherein the one or more entity suggestions include one or more content and/or contact suggestions based on the identified entities from the personal knowledge graph.

14. The system of claim 13, wherein the one or more content and/or contact suggestions include a reference to one of the existing e-mail messages of the user.

15. The system of claim 11, wherein the identified entity relations include content-content relations, user-content relations, and user-user relations.

16. The system of claim 11, wherein the one or more processors are caused to perform further operations comprising:

analyzing data entered by the user in one or more data fields of the e-mail message; and indexing the analyzed data based on whether the data is determined to be content-related data or contact-related data.

17. The system of claim 11, wherein the e-mail message is being composed by the user in an e-mail message composing view, and wherein the one or more processors are caused to perform further operations comprising:

providing the one or more entity suggestions for presentation to the user in the e-mail message composing view.

18. The system of claim 11, wherein the e-mail message is being composed by the user in an e-mail message composing view, and wherein the one or more processors are caused to perform further operations comprising:

providing the one or more entity suggestions for presentation to the user alongside the e-mail message composing view.

19. The system of claim 11, wherein the one or more processors are caused to perform further operations comprising:

receiving, from the user, feedback about the one or more entity suggestions provided to the user; and updating the personal knowledge graph constructed for the user based on the received feedback.

20. One or more non-transitory computer readable media storing computer-executable instructions that, when executed by one or more processors, causes the one or more processors to perform operations comprising:

extracting content entity data from existing e-mail messages of a user, wherein the content entity data includes content entities and their association with the e-mail message from which it was extracted;

extracting user entity data from the user's existing e-mail messages, wherein the user entity data includes user entities and their association with the e-mail message from which it was extracted;

identifying content-content relations between the extracted content entities;

identifying user-content relations between the extracted user entities and the extracted content entity;

identifying entity-entity relations between different extracted user entities;

constructing a personal knowledge graph for the user including extracted content entities, the extracted user entities, the identified content-content relations, the identified user-content relations, and the identified entity-entity relations;

analyzing contents of an e-mail message being composed or viewed by the user;

identifying, from the personal knowledge graph constructed for the user, entities related to the analyzed contents of the e-mail message, wherein the identified entities include one or more of the content entities, one or more of the user entities, or both;

generating one or more entity suggestions based on the identified entities and the content-content relations, user-content relations, and/or entity-entity relations included in from the personal knowledge graph; and providing the one or more entity suggestions to the user while the e-mail message is being composed or viewed by the user.

* * * * *